US012243510B2

(12) United States Patent
Shukla

(10) Patent No.: US 12,243,510 B2
(45) Date of Patent: Mar. 4, 2025

(54) METHODS AND SYSTEMS FOR ENGINE SOUND SYNTHESIS

(71) Applicant: Harman International Industries, Incorporated, Stamford, CT (US)

(72) Inventor: Sunil Shukla, Dublin, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 261 days.

(21) Appl. No.: 18/048,326

(22) Filed: Oct. 20, 2022

(65) Prior Publication Data

US 2023/0139893 A1 May 4, 2023

Related U.S. Application Data

(60) Provisional application No. 63/263,215, filed on Oct. 28, 2021.

(51) Int. Cl.

*H03G 3/00* (2006.01)
*G10K 15/02* (2006.01)
*H04R 3/00* (2006.01)
*H04B 1/00* (2006.01)

(52) U.S. Cl.

CPC ............... *G10K 15/02* (2013.01); *H04R 3/00* (2013.01); *H04R 2499/13* (2013.01)

(58) Field of Classification Search

CPC ....... G10K 15/02; H04R 3/00; H04R 2499/13
USPC ...................................................... 381/86, 61
See application file for complete search history.

(56) References Cited

FOREIGN PATENT DOCUMENTS

FR 2974442 A1 * 10/2012 ............. G10K 15/02
WO 2012143659 A1 10/2012

OTHER PUBLICATIONS

P. Dutilleux et al. "Time-Segment-Processing" in "DAFX: Digital Audio Effects", Mar. 11, 2011 (Mar. 11, 2011), ISBN: 978-0-47-066599-2, pp. 185-217, DOI: 10.1002/9781119991298.ch6 (Year: 2011).*
Sample-based engine noise synthesis using an enhanced pitch-synchronous overlap-and-add method (Year: 2012).*
Jagla, J. et al., "Sample-based engine noise synthesis using a harmonic synchronous overlap-and-add method," Proceedings of the 2012 IEEE International Conference on Acoustics, Speech and Signal Processing (ICASSP), Mar. 25, 2021, Kyoto, Japan, 4 pages.
Jagla, J. et al. "Sample-based engine noise synthesis using an enhanced pitch-synchronous overlap-And-Add method," The Journal of the Acoustical Society of America, vol. 132, No. 5, Nov. 2012, 12 pages.
Dutilleux, P. et al., "Time-segment Processing," DAFX: Digital Audio Effects, Mar. 31, 2002, 36 pages.
European Patent Office, Extended European Search Report Issued in Application No. 22203275.7, Mar. 2, 2023, Germany, 26 pages.

* cited by examiner

*Primary Examiner* — Ammar T Hamid
(74) *Attorney, Agent, or Firm* — McCoy Russell LLP

(57) ABSTRACT

Methods and systems are provided for engine sound synthesis. In one example, a method may include generating a vehicle sound at a modified pitch for a range of engine speeds by selecting intermediate segments of a sample sound and applying synchronous pitch overlapping added from the sample sound. The sound samples may be engine sounds recorded at specific RPM and the pitch modified based on a desired RPM.

20 Claims, 7 Drawing Sheets

METHODS AND SYSTEMS FOR ENGINE SOUND SYNTHESIS

CROSS REFERENCE TO RELATED APPLICATIONS

The present application claims priority to U.S. Provisional Application No. 63/263,215, entitled "METHODS AND SYSTEMS FOR ENGINE SOUND SYNTHESIS", and filed on Oct. 28, 2021. The entire contents of the above-listed application are hereby incorporated by reference for all purposes.

FIELD

The present description relates generally to methods and systems for sound synthesis in a vehicle system.

BACKGROUND

The addition of synthetic engine sounds is one way of enhancing an experience of operating a vehicle. Synthetic engine sounds may be played through the sound production devices of the vehicle to supplement and/or modify the sound produced by electric, hybrid-electric, or internal combustion engine vehicles. In electric and hybrid-electric vehicles, such synthetic audio may provide the driver with an acoustic feedback about the operational status of the vehicle, e.g., travelling speed. In addition, synthetic engine sounds may support vehicle safety and serve an aesthetic role, e.g., by mimicking sounds a driver may expect and/or find pleasant during the driving experience.

Some attempts to address the production of realistic engine sounds, e.g. Engine Sound Synthesis (ESS), in electric vehicles and in other applications include granular synthesis systems and pitch shifting. In a granular synthesis system, samples of recorded engine sounds are split into small "granules." The pitch, e.g., fundamental frequency, of the granules may be modulated based on inputs including speed, revolutions per minute (RPM), and driver behavior. In the current implementation, ESS utilizes Asynchronous Sample Rate Conversion (ASRC) pitch modulation to achieve sound output based on target RPM. In an example of ASRC, input samples are provided at a fixed sample rate. The system may then provide a non-integer sample rate conversion based on the required targets and the output stream is played back at a fixed sample rate. The resulting audio output has a shift in pitch.

However, the inventors herein have recognized potential issues with such systems. As one example, pitch shift based on sample rate conversion may produce a clean sound but producing realistic sound may pose challenges. Under some conditions, there may be a tension between balancing sound complexity and distortion in sample rate conversion methods. As an example, high-order filters may be used to produce a sound with less distortion. However, this strategy may not be practical for some vehicle processor systems, especially systems without specialized processors to support high-order filters. Current methods of engine sound synthesis may be expensive in terms of processing, and in some examples, may be challenged by signal interference due to interpolation.

SUMMARY

In one aspect, a method comprises, generating a vehicle sound at a modified pitch for a range of engine speeds by selecting intermediate segments of a sample sound and applying synchronous pitch overlapping added from the sample sound. In this way, high quality, pitch-scaled engine sounds may be synthesized efficiently and with reduced computational complexity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

This disclosure may be better understood from reading the following description of non-limiting embodiments, with reference to the attached drawings, wherein below.

DETAILED DESCRIPTION

Figure 1:
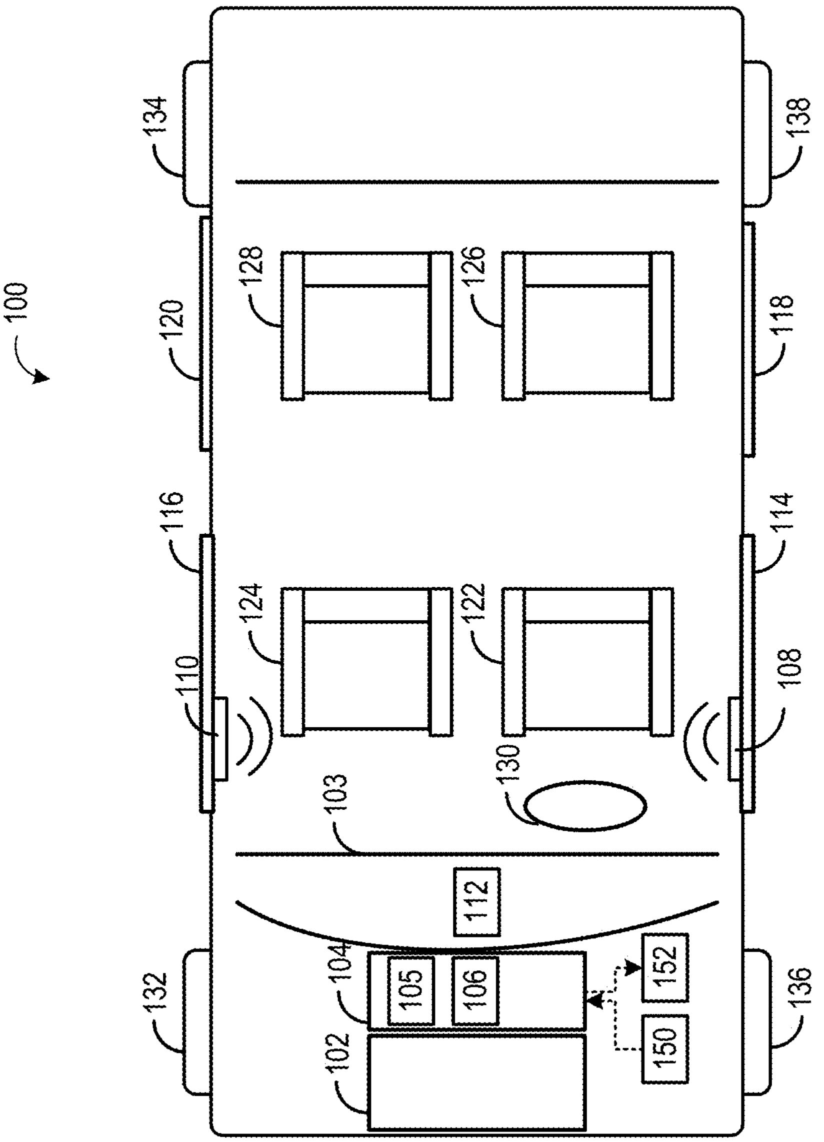
FIG. 1 shows a schematic of an electric vehicle sound system with a controller and speakers, in accordance with one or more embodiments of the present disclosure.

The following description relates to systems and methods for engine sound synthesis. Included is a method for generating a vehicle sound by modifying the pitch of a sample sound collected at a specific RPM and scaling the pitch in real time to match a desired RPM. The pitch scaling uses a Pitch Synchronous Overlap-Add (PSOLA) method, which involves applying synchronous pitch overlapping added from collected sample sound, resulting in a signal with a different pitch, e.g., as required by the target RPM.

In one of a number of exemplary embodiments of the methods disclosed herein, two phases may be included: an offline analysis phase and a real time synthesis phase. An analysis phase may include the collecting and processing of audio samples. In one example, the audio samples may be recorded engine sounds at fixed engine RPM. Processing of the audio samples may include segmentation and pitch marking. Segmentation and pitch marking may include identification of the pitch period in each segment (called "pitch marks"). Following, the input audio stream may be broken into short segments of audio based on the pitch of the segment. Thereafter, the entire stream may be re-segmented to ensure each segment contains one unique pitch mark along with adjacent audio. An audio segment may represent a dominant pitch at a particular engine speed and the accompanying lesser waveforms of the segment that contribute to the fullness of the natural sound.

The analysis may continue with window generation, which includes generating appropriate window coefficients for segment lengths. Following, each segment may be multiplied with the window, e.g., sample-by-sample multiplication. In some embodiments, window generation may be included in the synthesis phase. The windowed segments, pitch marks, and segment indices may be retrievably stored in a memory of a control system of a vehicle. In one example, the windowed segments and metadata may be stored as a lookup table. In one of a number of exemplary embodiments, the method may be implemented in a way that minimizes real time processing by performing intensive calculations offline.

Continuing with further embodiments of the methods disclosed herein, a synthesis phase may include retrieving and processing the modified engine sound data, e.g. windowed segments, according to a desired pitch shift based on a pitch shift factor. In some embodiments, the pitch shift factor may be determined based on signals received by the controller. For example, a pitch shift may correspond to an increase in engine speed, e.g., from 500 to 2000 RPM. The increase (or decrease) of engine speed may be divided into smaller, intermediate segments, for example, depending on the range of engine speed transition. An overlap index may be calculated for each representative segment of each speed region. The overlap index calculator may compute indices for summation of each representative segment based on the required pitch shift, the sample pitch marks, and lengths of the current and previous segments. Following the application of a delay, an audio output may be computed by summing the representative segments based on overlap calculations, e.g., sample-by-sample addition. In some embodiments, the synthesis phase may include addition of audio segments that were window-multiplied offline, relieving the on-board processor of intensive computation and allowing for the real time synthesis of natural sounding engine noise.

Figure 2:
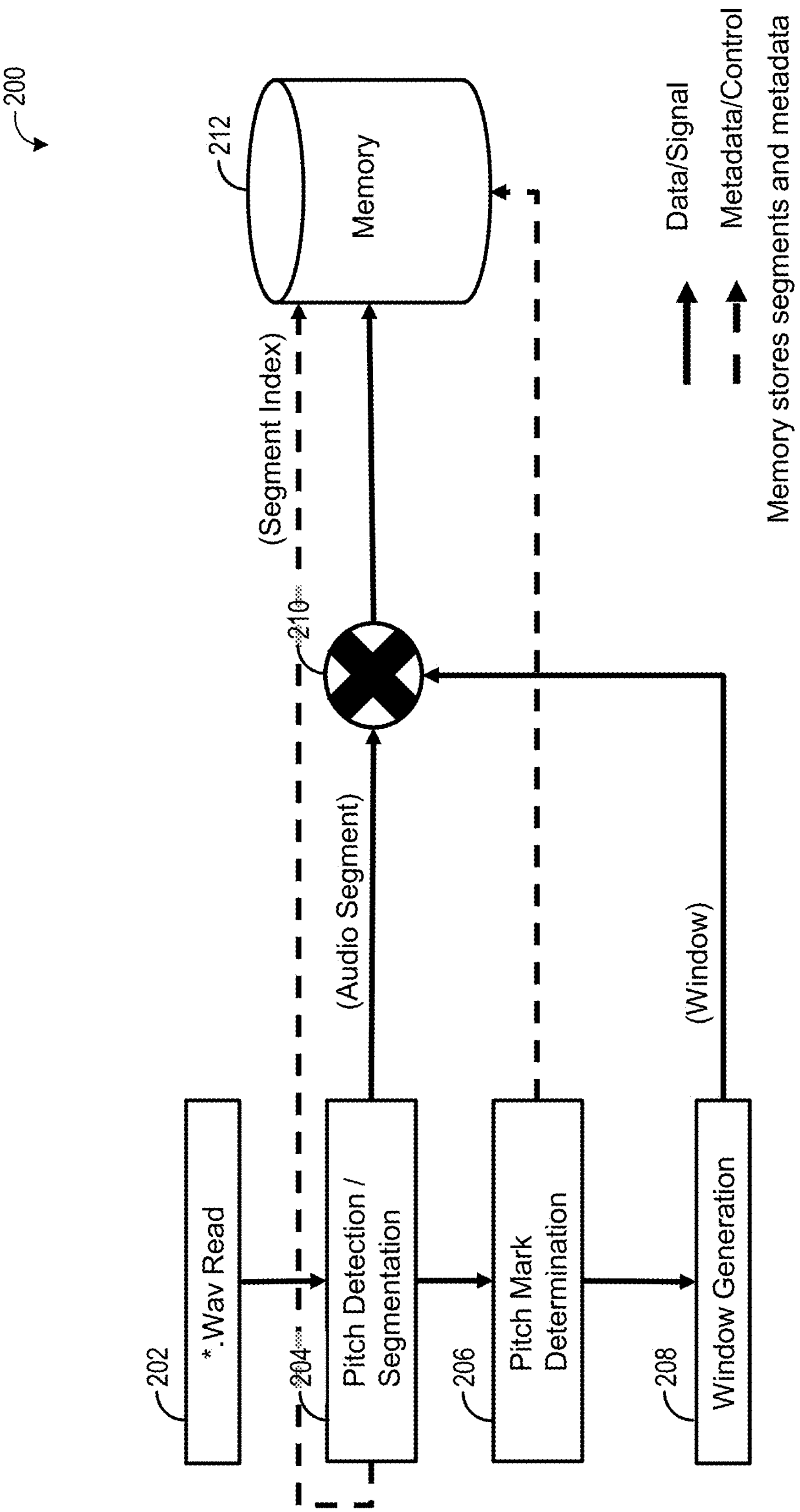
FIG. 2 shows a strategy for collecting and processing representative data corresponding to pre-determined engine speed and pitch, in accordance with one or more embodiments of the present disclosure.

The strategies and methods described herein may be executed by a vehicle system. An example electric vehicle system 100 is illustrated in FIG. 1. A strategy for collecting and processing representative engine sound samples corresponding to pre-determined engine speed and pitch is shown in FIG. 2. In one example, representative engine sound samples may be analyzed following a method 300 illustrated in FIG. 3. FIG. 4 is a strategy for real time synthesis of engine sounds using PSOLA. In one example, synthetic engine sounds may be produced in real time following a method 500 illustrated in FIG. 5. An example illustration of a PSOLA synthesis method for modifying audio is depicted in FIG. 6A. FIG. 6B is an example illustration of pitch shifting using PSOLA synthesis. In one example, transient engine sounds may be generated over a large range of engine speeds following the exemplary method 700 of FIG. 7.

FIG. 1 shows a vehicle system 100. In one example, the vehicle system 100 may be an electric vehicle that includes an electric motor 102, a controller 104, and a plurality of sound production devices, e.g. a first speaker 108 and a second speaker 110. The various components of the vehicle system 100 may be controlled by the controller 104. In another example, the vehicle system may be a hybrid vehicle system including an electric motor and an internal combustion engine.

The vehicle system 100 may include a driver seat 122 and a plurality of passenger seats 124, 126, 128. There are four seats in FIG. 1, but in other embodiments, the vehicle may include more passenger seats or fewer passenger seats. The vehicle may include one or more operable windows, e.g., a first window 118 and a second window 120. As an example, a passenger may operate the one or more windows via a switch that signals to the controller to open or close the window. The vehicle may include a plurality of wheels 132, 134, 136, 138. The first speaker 108 and second speaker 110 may be arranged in a first door 114 and a second door 116, respectively, of the vehicle 100 (e.g., a right-front door and a left-front door). In some examples, the vehicle system may include fewer, more, and/or differently positioned speakers.

In one of many embodiments, the controller 104 is shown in FIG. 1 as a microcomputer including a microprocessor unit 105, e.g., MIPS, and a memory 106, e.g., read-only memory, random access memory. The controller 104 may include input/output ports and a conventional data bus. The controller may receive information from a plurality of sensors 150 and may send control signals to a plurality of actuators 152. The controller, while overseeing control and management of the vehicle system, may be configured to receive signals from a variety of sensors, as further elaborated herein, in order to determine operating parameters and operating conditions, and correspondingly adjust various vehicle system actuators to control operation of the vehicle system. In exemplary embodiments, the controller 104 may receive various signals from sensors coupled to vehicle system 100, not limited to electric motor torque, electric motor speed, vehicle speed, drive mode, steering wheel angle, and wheel speed. In some embodiments, the controller 104 may be in direct communication (e.g., wired) with the components of the vehicle system 100, and in other embodiments the controller 104 and components of the system may be in wireless communication. In an example, the controller 104 may be in direct communication with the electric motor 102 and the actuators and sensors thereof.

A vehicle operator may control the vehicle from the driver seat 122 to supply various inputs to the controller 104. As an example, the controller may receive signals from a plurality of vehicle operator input devices, e.g., an accelerator pedal, brake pedal, wheel. As such, output from a sensor of the input device may be used to determine actions of the controller 104. Direct inputs to the controller 104 may include power demand, e.g., operation of an accelerator pedal and/or a brake pedal. Another input may include the operation of a steering wheel 130. A further input to the controller 104 may include a wheel speed at the plurality of wheels 132, 134, 136, 138. The driver and/or one or more passengers of the vehicle may supply inputs via operation of one or more windows, e.g., a first window 118 and a second window 120, and/or via operation of the plurality of doors 114, 116, e.g., open and shut. Additional inputs not described here may be included in embodiments of the methods and systems described herein.

The vehicle system may include an onboard transmitting device 112, which may feature a processor, a memory, a user interface, and an audio subsystem. In some embodiments, the onboard transmitting device 112 is integrated into a dashboard 103 of the vehicle system 100. In some embodiments, the first speaker 108 and the second speaker 110 are electronically coupled via a wired connection to the onboard transmitting device 112, whereby an audio output generated by the controller 104 may be listened to via the plurality of speakers. Specifically, the controller 104 of the vehicle system may process an audio signal, the audio signal including first and second channel information, where the first and second channel information is received and played at the first speaker 108 and the second speaker 110, respectively.

In one of many exemplary embodiments, engine sounds may be synthesized in real time by the controller 104 according to the methods described herein. As an example, the controller 104 may receive a signal from an input of the vehicle operator stepping on the accelerator pedal. The controller 104 will control the electric motor 102 to increase motor speed, thus increasing the travelling speed of the vehicle. In an example, a motor speed sensor (e.g. one of the plurality of sensors 150) detects the increase in motor speed and signals back to the controller the speed increase. In this example, the controller will access the memory 106 to select from a lookup table a new audio segment of the appropriate RPM. The audio segment may be processed in real time on the microprocessor unit 105 of the controller 104, according to the strategies and methods described herein (FIGS. 2-5), e.g., the new audio segment pitch shifted, overlapped and added to the synthetic engine audio signal. The synthesized waveform may be played through the first speaker 108 and the second speaker 110 of the vehicle system 100.

An example of a strategy 200 to collect and process data corresponding to pre-determined engine speed and pitch is illustrated as a block diagram in FIG. 2. PSOLA utilizes pitch to identify representative segments, and modifies the pitch of the output audio. As an example first phase, audio may be analyzed for downstream synthesis. In one example, the strategy herein may enable the processing of engine noise data in an offline environment, preparing the data for natural sounding and efficiently produced engine sound synthesis in real time during vehicle operation. As noted herein, the approach of FIG. 2 may be programmed into instructions stored in memory of a computation device.

At 202, the first input to the analysis system includes an audio file. In at least some embodiments, the audio file may be written in the Waveform Audio File Format, e.g., a WAV file. In an example, the input WAV file may include audio data corresponding to pre-determined engine speed and pitch. In some examples, inputs may include WAV files of recorded engine sounds at fixed RPM. In an example, sampled sound may include automotive internal combustion engine speeds recorded for 500 RPM intervals ranging from 0 to 9000 RPM. The WAV file may be read by a WAV file reading device of the analysis system. In one of many exemplary embodiments, the WAV file may be read by a computer.

At 204, the WAV file may be analyzed according to pitch detection and segmentation. Pitch detection identifies the location of dominant frequencies in an audio stream, e.g., the pitch period. Throughout the audio input, the start and stop of each pitch period, or "pitch marks", may be annotated. The audio stream may be divided at each pitch period into short, representative segments (or segments) of audio based on the pitch of the segment. In some examples, a pitch detection algorithm may be used to identify the dominant pitch in any segment of audio input. In some examples, automation, e.g., autocorrelation, may be used to pitch detect and segment one or more WAV files. In some examples, a technician may listen to the audio and manually identify pitch periods. In other embodiments, pitch detection and segmentation of WAV files may be performed using a combination of automated and manual techniques.

At 206, the strategy includes pitch mark determination. In pitch mark determination, the segmented audio is re-segmented in such a way as to ensure each representative segment contains one unique pitch mark along with adjacent audio. Each segment of audio may have corresponding pitch mark metadata.

At 208, the strategy includes the generation of signal processing window coefficients for each length of segmented audio. In one example, the signal processing window coefficient influences an amount of overlap between adjacent audio segments (based on pitch frequency). A window length may be a function of the desired range in the ability to change a pitch. In some examples, the window length may be 2 to 3 times the length of the segment. The window is tied to the dominant frequency of each period. For example, the window coefficient of 3× for a pitch period of 100 samples will generate a window length of 300 samples. The window coefficient of 3× selected for a pitch period of 105 samples will generate a window length of 315 samples. Each window has a different set of coefficients. In some examples, the windows may be generated by a standard formula with an input of sample number and an output of a set of coefficients.

At 210, the strategy includes multiplying each pitch marked audio segment by the signal processing window coefficient. Each dominant frequency period is multiplied by the window coefficient so that they may be smoothly overlapped and added to the synthesized waveform that may be constructed in real time as detailed below in FIGS. 4 and 5. Windowing extends the edge of an audio segment such that the overlapping of processed segments during sound synthesis produces a natural engine sound. In some examples, window generation may proceed in real time as part of the waveform synthesis via the vehicle controller. In other examples, window generation may proceed offline, e.g., prior to memory storage on the vehicle controller.

At 212, the windowed audio segments (optionally, not windowed), pitch marks and segment indices may be stored in memory, e.g., in the memory of the controller 104 of the vehicle system 100 in FIG. 1. The storage of windowed segments may have the advantage of greater efficiency during real time sound synthesis. In some examples, audio segments may be stored in memory without having been first multiplied by a window coefficient. In some examples, audio segments may be multiplied by their windows in real time during engine sound synthesis.

In one example, by performing the strategy described with respect to FIG. 2 offline, intensive computations may be processed prior to implementation in a vehicle system. The processed sound samples and metadata may be stored in the memory of the controller of the vehicle system. In some embodiments, the sound samples may then be retrieved and manipulated in real time following the method 500 of FIG. 5 and the method 700 of FIG. 7.

Figure 3:
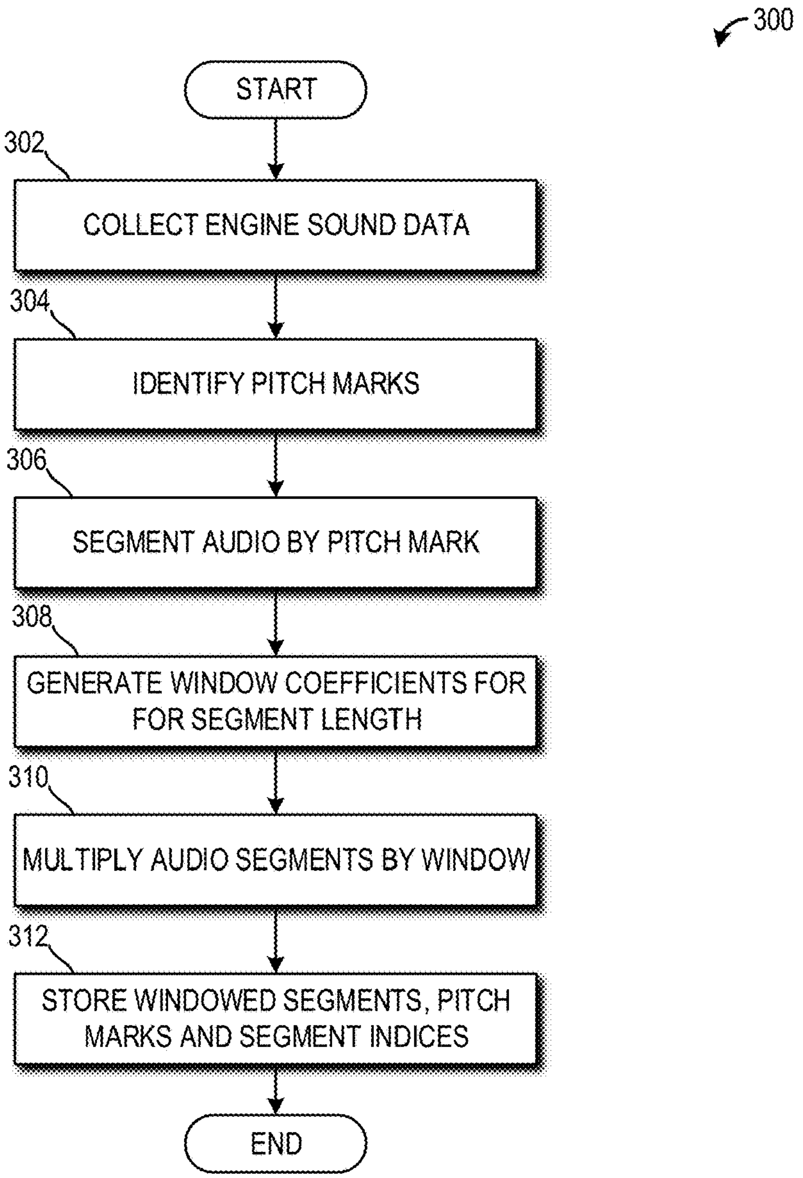
FIG. 3 is a method for analyzing representative data following the strategy of FIG. 2, in accordance with one or more embodiments of the present disclosure.
Figure 4:
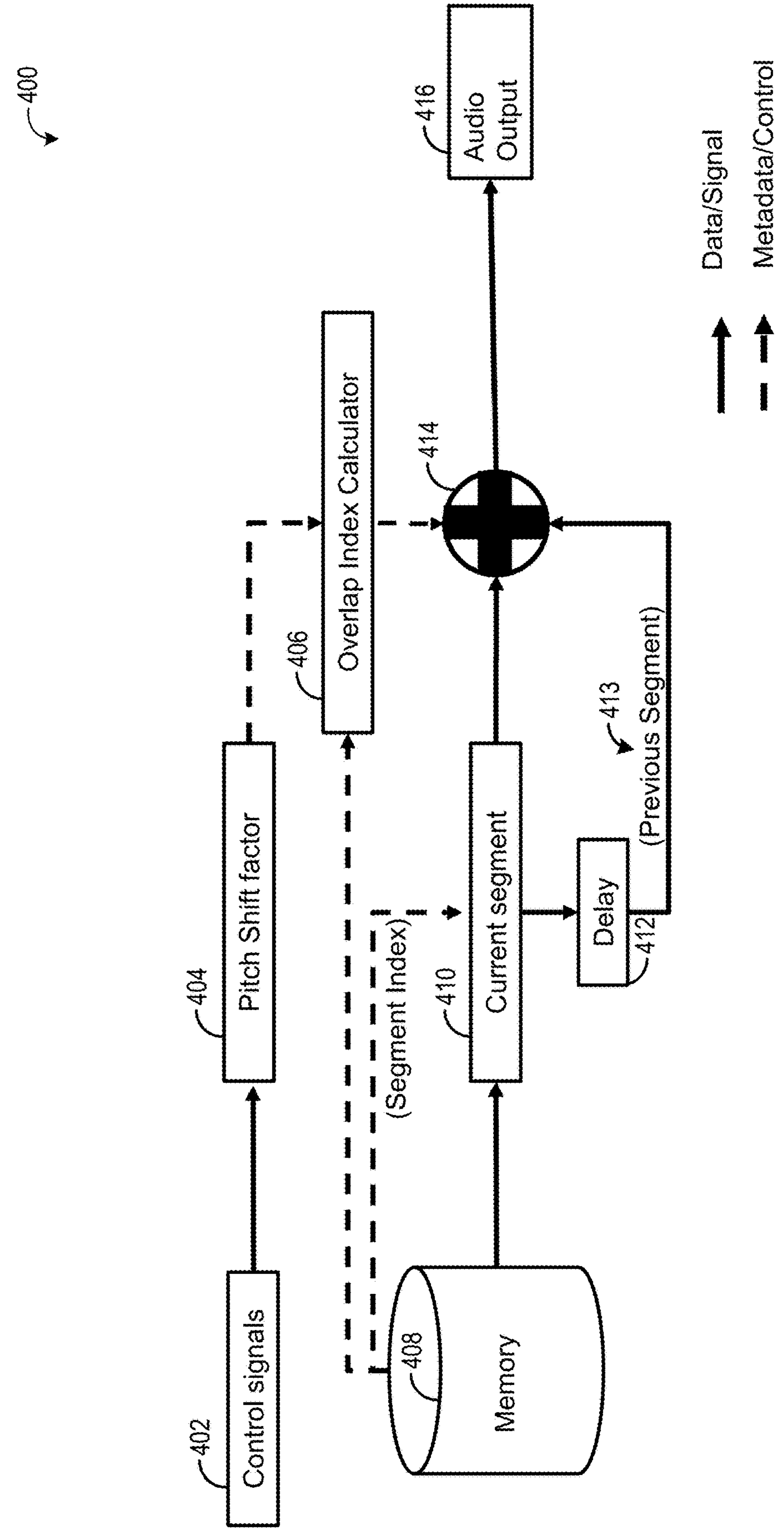
FIG. 4 is a strategy for synthesizing and pitch shifting engine sounds using Pitch Synchronous Overlap-Add, in accordance with one or more embodiments of the present disclosure.

FIG. 3 is a method 300 for analyzing representative sound samples following the strategy of FIG. 2. Instructions for carrying out the method 300 and the rest of the methods included herein may be executed by a controller based on instructions stored on a memory of the controller and in conjunction with signals received from sensors of the vehicle system, such as the controller 104 and the sensors 150 described above with reference to FIG. 1. The controller may employ actuators of the vehicle system, e.g., actuators 152 in FIG. 1, to adjust vehicle system operation, according to the methods described below.

The method 300 begins at 302, where engine sound samples may be collected. In some embodiments, engine sound samples may collected for ranges of engine speed. As an example, audio files may be generated for engine sounds at 500 RPM intervals ranging from 0 to 9000 RPM. In some embodiments, the sound data may be stored in the WAV file format.

The method 300 continues to 304, where pitch marks may be identified. To identify pitch marks, the audio input may be read by an audio file reading device of the analysis system, e.g., a computer. The start and stop of each pitch period, e.g., a location of a dominant frequency, in the audio stream may be annotated as a pitch mark. Pitch marks may be identified using an automated strategy, a manual approach, or using a combination of manual and automated approaches.

The method 300 continues to 306 where the input engine sound samples may be divided into short segments of audio based on the identified pitch mark locations. As with pitch mark identification, automated, manual or combinatory strategies may be used to segment the audio file by pitch. At this step, audio segments may contain one unique pitch mark along with adjacent audio.

The method continues to 308, where the signal processing window coefficients may be generated for each segment length. Signal processing windows may be generated based on a standard formula where the input is the number of samples of the signal and the output is a set of coefficients. In some examples, the window length may be a function of how much range is desired in the ability to change a pitch. As examples, window length may be 2 to 3 times the length of the segment.

The method continues to 310, where the method includes modifying each audio segment based on its respective signal processing window coefficient. In some examples, the audio segments may be multiplied by the window. As an example, a 2× signal processing window coefficient for a pitch period of 125 samples will generate a window length of 250 samples, whereas the same coefficient for a 150 sample pitch period will generate a window length of 300 samples. In some examples, the overlap window may be tied to the dominant frequency of each period. The window length may be thought of as a time duration where a first pitch mark may be overlapped with a second pitch mark, e.g., a subsequent pitch mark.

The method continues to 312, where windowed segments, pitch marks and segment indices may be stored in the memory of the vehicle system, completing the method 300. Special challenges of the method 300 may include identifying a base pitch frequency, or dominant frequency, among the many, layered frequencies in an engine sound audio file. In an example of the method 300, a hybrid approach may be used. First, a technician may apply an autocorrelation algorithm to the waveform to determine a general dominant frequency. Thereafter, the technician may undertake a manual review of the autocorrelated calculations. For example, the technician may review "by ear" the pitch marks and their boundaries. During the manual review, the technician may adjust the autocorrelated calculations. In other examples, a more developed pitch detection algorithm may be utilized, and in such an example, the manual review may be optional.

FIG. 4 is a block diagram of a strategy 400 for modifying the pitch of harmonic engine noise in an engine sound synthesis system that may minimize real time processing complexity. In the strategy 400 of FIG. 4, processed engine sound samples, e.g., following the exemplary strategies of FIGS. 2-3, are retrieved from a vehicle on-board database and added to a synthetic audio stream according to a desired pitch shift based on a pitch shift factor. In one example, the pitch may be modified by overlapping and adding segments of the sample sound in a pitch synchronous manner to match a desired engine RPM. The result is a natural sounding, real time synthesized engine sound.

The strategy begins at 402, where control signals may be received. Control signals may be received by the controller via sensors of the vehicle system (e.g., vehicle system 100 of FIG. 1). Control signals may include a status of the electric motor (e.g., on or off), electric motor speed, vehicle speed, wheel speed, a status of the audio system (e.g., competing audio signals, radio), a status of windows and/or doors (e.g., open or closed), geolocation, etc.

At 404, one or more control signals may be input to a lookup table to identify the pitch shift factor. The lookup table compares the control signals received by the controller (e.g., electric motor speed) to indexed pitch marks. When the controller receives control signals indicating a transition in engine sound is appropriate, the pitch shift factor may represent the desired pitch to be added to the synthesized audio stream.

At 406, the strategy includes calculating the overlap index. The overlap index calculation may compute indices for the summation of each audio segment. The summation indices may be based on the pitch shift factor, the pitch marks, and the lengths of the segments. The overlap index may be calculated to determine where the next pitch period will be copied. In other words, at which sample point a new segment may be added to the existing synthesized signal. The overlap index is a tunable parameter that may contribute to the perceived quality of the synthetic sound. In some examples, the overlap index may be a fixed value. In some examples, the overlap index may be calibratable. In other examples, the overlap index may be based on vehicle operating conditions, e.g., travelling speed.

At 408, the strategy includes retrieving the appropriate segment and its respective segment index from the memory of the control system. In some embodiments, the segment may be a recorded sample of an engine sound at a fixed RPM. The segment may be selected based on the pitch shift factor determined at 404. The segment index includes segment length metadata that is included in the overlap index calculation at 406. The new segment retrieved at 408 is stored in the current segment block at 410.

At 412, a delay may be determined for the current segment block based on the previous segment. The delay unit stores the current segment for the next cycle of segment addition in the buffer block represented by 413. The current and previous segment blocks (e.g., 410 and 413, respectively) are buffers used to store adjacent segments being processed at any time.

At 414, the processed current segment is added to the previous segment with the appropriate delay as part of the continuous, real time synthesized audio stream.

At 416, audio output is computed after summing the two segments based on overlap calculations, e.g., sample-by sample additions. Each pitch period may be added to a new time vector while overlapping to match the added pitch period to the previous pitch period. The result is a dominant frequency signal that smoothly evolves through time based on operator inputs, while the audio signal retains the harmonic richness of natural engine sounds.

In an example, a pitch shift increase may be desired from 1000 hertz (Hz) to 1300 Hz. In this example, the desired pitch period is smaller than the present pitch period. In practice, the dominant pitch period center point may be replaced with a new target frequency. The windowed dominant frequency periods may be added to the present frequency resulting in a new axis and a realistic sounding audio stream at a different pitch. The timbre and overall quality are the same, as nothing has changed within the windowed area, but the dominant pitch has changed. In this way, the strategy may change the dominant frequency but not the local frequencies within the pitch period so the sound retains a cohesive and natural-sounding texture.

As described with respect to FIGS. 2 and 3, segment by window multiplication may occur during the analysis phase, e.g., pre-processing. In other examples, segment by window multiplication may occur during the synthesis phase. A preferred embodiment out of the many, in some examples, may be selected based on the processing power and/or the memory size of the control system.

Figure 5:
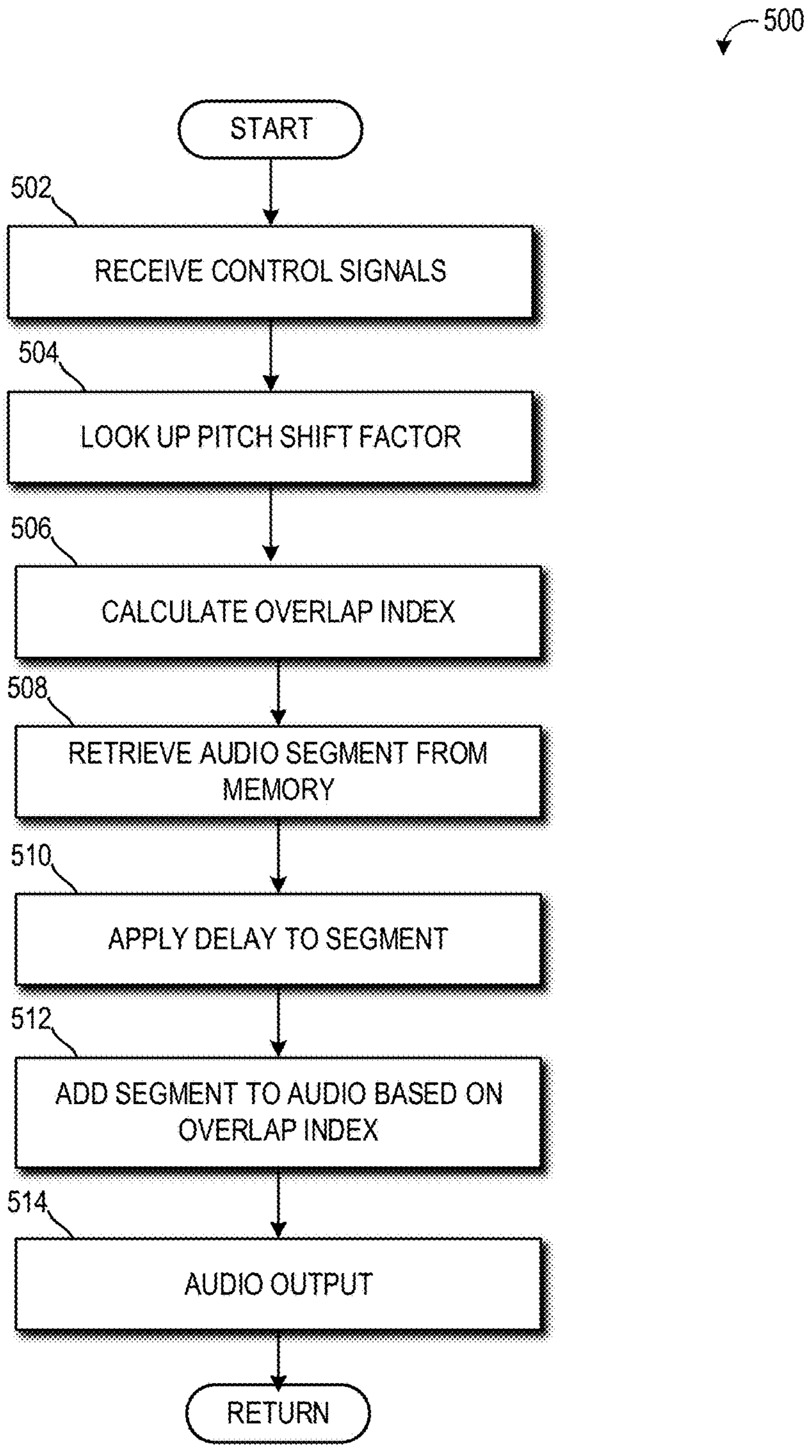
FIG. 5 is a method for synthesizing and pitch shifting engine sounds following the strategy in FIG. 3, in accordance with one or more embodiments of the present disclosure.
Figure 6B:
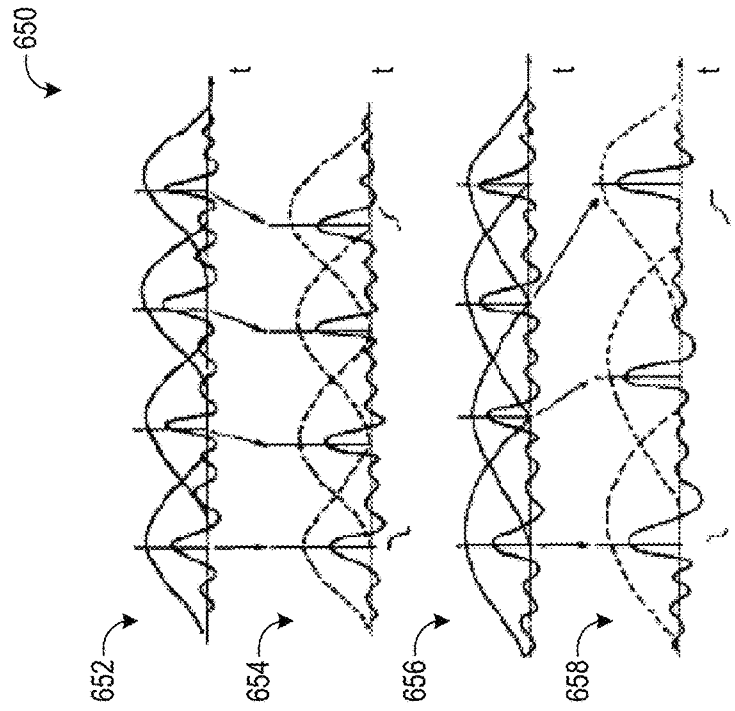
FIG. 6B is a second example illustration of the Pitch Synchronous Overlap-Add synthesis method for modifying audio, in accordance with one or more embodiments of the present disclosure.
Figure 6A:
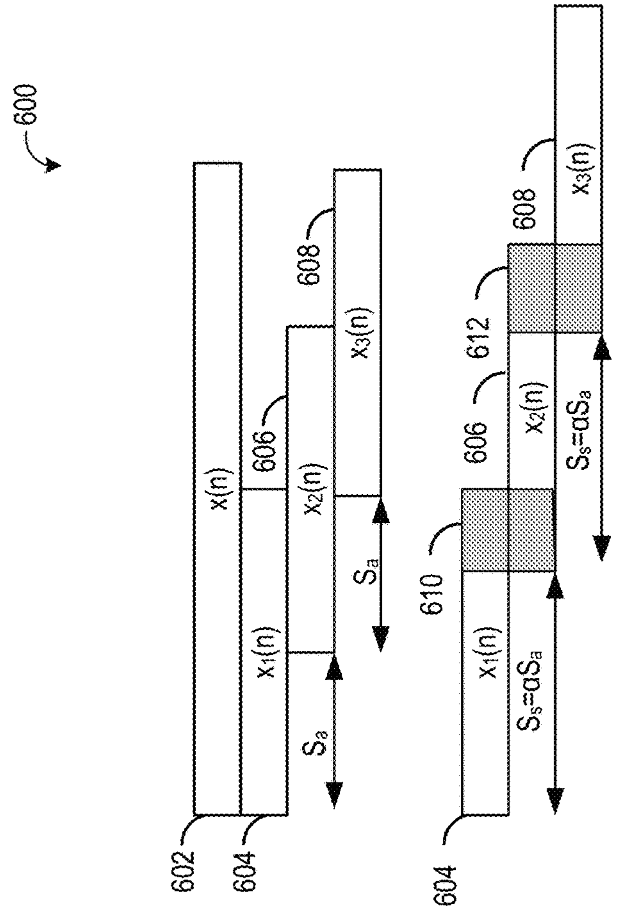
FIG. 6A is a first example illustration of the Pitch Synchronous Overlap-Add synthesis method for modifying audio, in accordance with one or more embodiments of the present disclosure

FIG. 5 is a method 500, and one of many embodiments of the strategy 400 of FIG. 4. The method 500 describes an engine sound synthesis phase, where processed engine sound samples stored in the memory of the control system of the vehicle may be retrieved, overlapped, and added according to the desired pitch shift based on the pitch shift factor The method begins at 502, where control signals may be received from the various sensors of vehicle system, e.g., vehicle system 100 of FIG. 1. Control signals may include a status of the electric motor (e.g., on or off), electric motor speed, vehicle speed, wheel speed, a status of the audio system (e.g., competing audio signals, radio), a status of windows and/or doors (e.g., open or closed), geolocation, etc. Additional control signals may be included in the other examples of the methods and systems described herein.

At 504, the method includes looking up a pitch shift factor. One or more of the control signals may be inputted to a lookup table to obtain the pitch shift factor. In some examples, pitch marks may be indexed with engine RPM. For example, the method may determine whether the present pitch of the audio stream matches the pitch indexed for the target engine speed of the vehicle.

At 506, the method includes calculating an overlap index based on the pitch shift factor, the pitch marks, and lengths of the windowed segments to determine where in the sample location of the existing synthesized signal the next pitch period may be added. The overlap index calculator computes indices for summation of each segment to be added to the waveform. In some examples, the overlap index may be a fixed value and calibratable. In other examples, the overlap index may be based on vehicle operating conditions. As an example, the overlap index may be based on vehicle speed, where the indices may be calculated to overlap more at higher vehicle speeds and overlap less at lower vehicle speeds.

At 508, the method may include retrieving the audio segment to be added from the memory of the control system of the vehicle system. In some examples, the audio segment may be an engine sound sample at a recorded RPM, e.g., 2000 RPM.

At 510, the method may modify the audio segment based on an application of delay to the segment. In one example, the amount of delay added to the audio segment may be based on the length of the segment to which it is added. The method may include storage blocks for current and previous samples to calculate the delay the next cycle.

At 512, the current segment and new segment are added based on the overlap index. Audio output is computed by summing the two segments based on overlap calculations (sample-by-sample addition). Each segment may be added to a new time vector while overlapping to match the new segment.

At 514, the output audio is played through the speakers of the vehicle system.

The synthesis phase may include, in some examples, the addition of segments only, since window multiplication may be completed in an offline analysis. From a real time perspective, the strategies and methods described in FIGS. 2-5 may be much more computationally efficient than sample rate conversion. As an example, in sample rate conversion, one must up-sample, filter (e.g., FYR filter), and then down-sample to a new pitch, which may be intensive in terms of microprocessor speed, especially during the real time pitch change.

As an example of the method 500, an engine sound database may include segments of sound samples representing a range of engine speeds, e.g., 600-6000 RPM. Some embodiments of the method 500 may include selecting intermediate audio segments to smoothly transition over a large range, e.g., from a very low RPM to a very high RPM. An example method for producing engine sounds over a large range is described in more detail in FIG. 7.

FIG. 6A and FIG. 6B are exemplary illustrations of modifying audio samples for audio synthesis using the Pitch Synchronous Overlap-Add synthesis methods. Illustration 600 in FIG. 6A shows an example of an audio file segmented and reassembled to generate an audio output. Illustration 650 in FIG. 6B shows a pitch period increase and a pitch period decrease by overlapping and adding of audio samples.

Starting with FIG. 6A, the illustration 600 depicts utilizing an audio sample 602 to generate a modified output based on a control input. In the illustration 600, 'x' represents an audio segment and 'n' represents time. The audio sample 602 may be divided into representative segments: a first segment 604, e.g., $x_1(n)$, a second segment 606, e.g., $x_2(n)$, a third segment 608, e.g., $x_3(n)$. The segments may be overlapped depending on a scale factor defined by the control input. In one example, the pitch shift factor may be an example of the scale factor. In one example, the size, length, and magnitude of an overlap interval may be dependent on the scale factor. In one example, the overlap interval may be calculated following the overlap index calculation, such as described with respect to FIG. 4 and FIG. 5. A first overlap interval 610 may be calculated for the first segment 604 and the second segment 606. A second overlap interval 612 may be calculated for the second segment 606 and the third segment 608. The segments are multiplied by the window function, e.g., 2. The windowed segments then are overlapped and added according to the overlap interval resulting in a synthesized audio stream comprising the first segment 604, second segment 606, and third segment 608.

FIG. 6B shows an exemplary illustration 650 demonstrating pitch shifting. In each of the plots, the x-axis represents time. Plot 652 represents a first audio waveform at a first frequency that is modulated by the PSOLA addition of second audio segment of a second, faster frequency. The pitch of the resulting audio stream in plot 654 will sound higher. Plot 656 represents a third waveform at a third frequency that is modulated by the PSOLA addition of a fourth audio segment at a fourth, lower frequency. In this example, the pitch of the resulting audio stream in plot 658 will sound lower. The pitch shift may be achieved while maintaining cohesion due to the retention of the contributing lesser frequencies.

PSOLA incorporates a residual signal and an added signal into a synthesized audio waveform. PSOLA applied to engine sound synthesis shares similarities with interpolation but results in a more elegant sound with an effect of maintaining minor waveforms intact. The overall quality and richness of the natural sound of an engine is preserved with RPM correlating pitch modulation achieved in real time.

Figure 7:
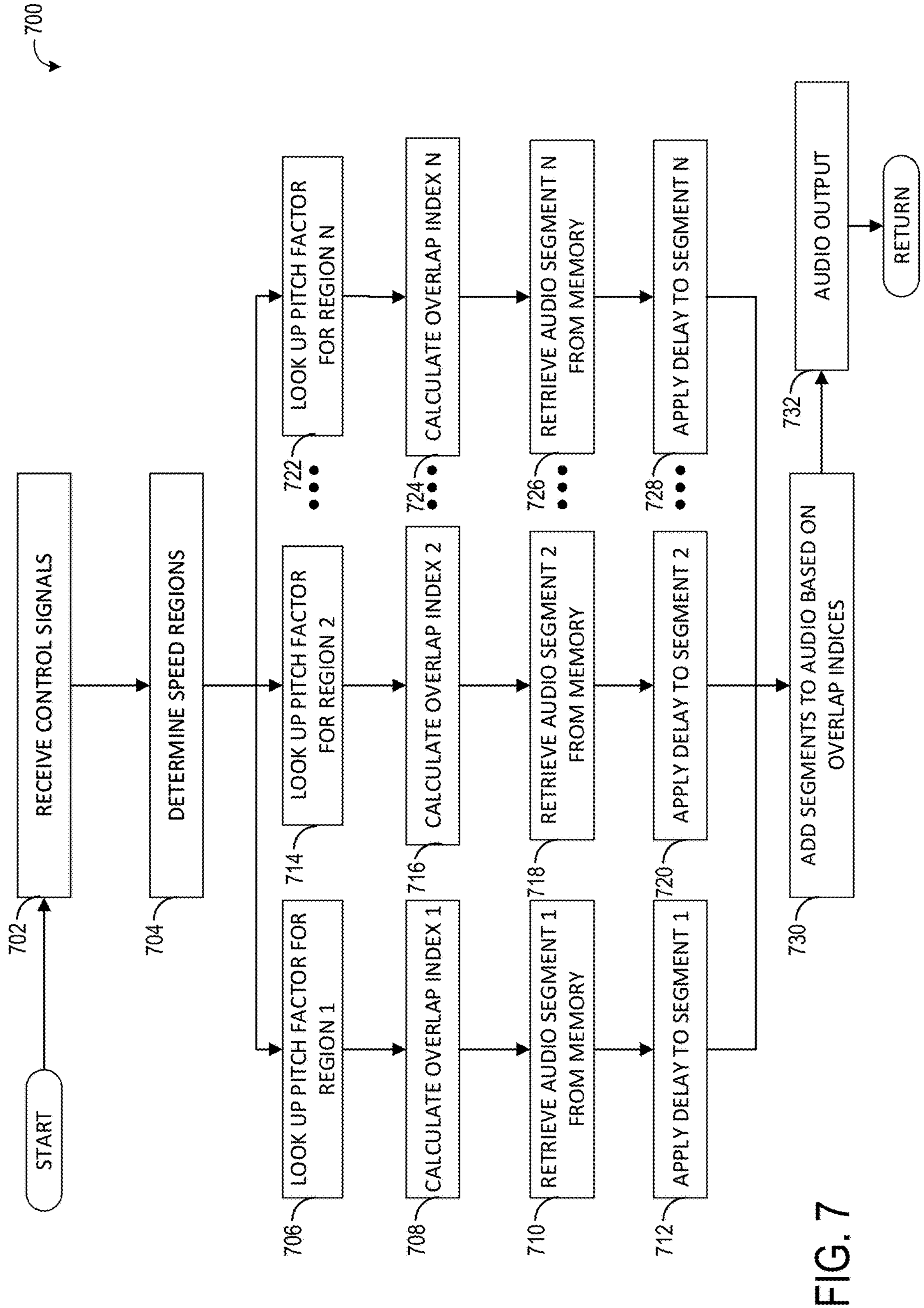
FIG. 7 shows a method for generating transient sounds over a large range of engine speeds, in accordance with one or more embodiments of the present disclosure.

FIG. 7 illustrates a method 700 for generating transient sounds over a large range of engine speeds. In one example, the method 700 includes selecting intermediate segments over a range of engine speed transition, applying PSOLA, and adding the segments of sample sound for an audio output.

The method begins at 702 and may include receiving control signals from the various sensors of vehicle system, e.g., vehicle system 100 of FIG. 1. Control signals may include a status of the electric motor (e.g., on or off), electric motor speed, vehicle speed, wheel speed, a status of the audio system (e.g., competing audio signals, radio), a status of windows and/or doors (e.g., open or closed), geolocation, etc. Additional control signals may be included in the other embodiments of the methods and systems described herein. As one example, the method may include receiving a range of engine speed transition from an engine speed sensor.

At 704, the method includes determining intermediate speed regions for the transition. For example, a transition from a first engine speed (e.g., 1000 RPM) to a second engine speed (e.g., 5000 RPM) may include dividing the range of engine speed transition into a plurality of intermediate speed regions. In one example, the intermediate speed regions include a first speed region, a second speed region, and a third speed region, shown as an nth speed region. In some examples, the transition may be broken into more or fewer intermediate regions depending on control signals such as the travelling speed, the range of the transition, and so on. In some examples, the transition may be divided into more or fewer intermediate regions depending on the range of sound samples stored in the on-board database.

At 706, the method includes looking up a pitch shift factor for the first region. In one example, the pitch shift factor for the first region may be a first representative segment of sample sound having a first pitch period corresponding to the first speed region of the transition. In one example, a RPM range for first speed region and other control signals may be input into the lookup table where indexed pitch shift factors are stored and the output is the appropriate pitch and segment length metadata for subsequent calculations. At 708, the method includes calculating a first overlap index for the first pitch shift factor. In one example, the first overlap index may be a first amount of segment overlap for the first representative segment and the adjacent segments. The overlap index calculations may be based on the pitch shift factor, the pitch marks, and the lengths of the segments. The overlap index is calculated to determine where the next pitch period will be added to the existing synthesized signal. At 710, the method includes retrieving the first audio segment from the memory of the control system. In one example, the first audio segment is the audio file corresponding to the pitch shift factor identified at 706. At 712, the method includes applying delay to the first segment. The amount of delay may be calibrated based on the length of the segment, the engine speed, and other control signals. In one example, applying delay may include storing the first representative segment as a buffer for a first duration. In one example, the first duration may be the duration of an addition of a second segment to the audio output.

In one example, at once and in parallel processes, an audio segment may be synthesized from sample sound for the second speed region and the subsequent regions through N regions of the transition. In other words, the audio segment for the second speed region may be prepared for addition to the audio output at the same time, and in parallel with, the first speed region and subsequent speed regions. At 714 the method includes looking up the pitch shift factor for the second region. In other words, a second representative segment having a second pitch period may be identified for the second speed region. At 716, the method includes calculating the second overlap index. In other words, a second amount of segment overlap for the second representative segment and adjacent segments. At 718, the method includes retrieving the second audio segment from memory. At 720, the method includes applying delay to the second segment. In one example, applying delay may include storing the second representative segment as a buffer for a second duration. In one example, the second duration may be the duration of the addition of a third representative segment to the audio output.

Similarly, at 722, the method includes looking up the pitch shift factor for the nth region. In one example, a third representative segment having a third pitch period may be identified for the third speed region. At 724, the method includes calculating the nth overlap index. For example, a third amount of segment overlap may be calculated for the third representative segment. At 726, the method includes retrieving the nth audio segment from memory and at 728 applying delay to the nth segment. For example, the third representative segment may be retrieved from memory and a third amount of delay applied thereto.

At 730, the processed audio segments are added sample-by-sample through N segments based on the overlap indices, including the appropriate delay as part of the continuous, real time synthesized audio stream. At 732, the audio output is played through the speakers of the vehicle system.

In an example, a transition from an engine speed of 500 RPM to 5000 RPM may include breaking down the transition into three speed regions. As an example, an input segment may be selected representing engine speeds from 500 RPM to 2000 RPM which may be scaled from 1000 to 2000 based on the first calculated overlap index. A second input file may selected representing engine speeds from 3000 to 4000, which may then be scaled from 2000 to 3000 RPM based on a second calculated overlap index. A third input file may selected representing engine speeds from 5000 to 6000, which may then be scaled from 4000 to 5000 RPM based on a third calculated overlap index. By breaking the transition into smaller granularities, a natural sounding speed ramp-up may be achieved.

In another example, a sound designer may wish to have different sound signatures for different speed regions within a full range of an engine speed transition. For example, the full range may include the engine speed transition from 300 to 4000 RPM. The full range may be divided into intermediate regions such as a first sound signature comprising 300 to 1000 RPM, a second sound signature comprising 1000 to 2000 RPM, a third sound signature comprising 2000 to 3000 RPM, and a fourth sound signature from 3000 to 4000 RPM. In one example, sound files representing engine sounds for the regions of the sound signatures may be stored in an on-board database. The sound designer may select any of the sound files from the database. The sound designer provides desired pitch curves for the full range of the engine speed transition. Following from the method 700, the pitch shift factor may be determined for each speed region based on the desired pitch and the actual pitch of the selected sound file. The overlap index may be calculated for each region, such as shown in FIG. 6A. Audio output may be synthesized using PSOLA, such as shown in FIG. 4.

The systems and methods described herein have the technical effect of modifying the pitch of harmonic engine noise in an engine sound synthesis system that minimizes real time processing complexity. By applying synchronous pitch overlapping added from sampled engine sound to modify the pitch of the sampled sound, audio may be produced that is responsive to operator input and may provide a range of acoustic feedback desired by drivers. In some embodiments, sound samples may be processed offline prior to real time sound synthesis, relieving the vehicle onboard processor of intensive computations. In this way, complex, natural-sounding, and driver-responsive engine sounds may be synthesized efficiently in real time for a range of engine speed transition.

The disclosure also provides support for a method comprising: generating a vehicle sound at a modified pitch for a range of engine speeds by selecting intermediate segments of a sample sound and applying synchronous pitch overlapping added from the sample sound. In a first example of the method, the modified pitch is based on a desired engine RPM, and the sample sound is an engine sound at a recorded RPM. In a second example of the method, optionally including the first example, a pitch of the sample sound is modified in real time to match the desired engine RPM. In a third example of the method, optionally including one or both of the first and second examples, the pitch is modified by overlapping and adding segments of the sample sound in a pitch synchronous manner. In a fourth example of the method, optionally including one or more or each of the first through third examples, the sample sound is recorded engine sounds at a fixed engine RPM. In a fifth example of the method, optionally including one or more or each of the first through fourth examples, the sample sound is divided into representative segments. In a sixth example of the method, optionally including one or more or each of the first through fifth examples, the representative segments are overlapped depending on a scale factor. In a seventh example of the method, optionally including one or more or each of the first through sixth examples, a pitch period identifies the representative segments. In an eighth example of the method, optionally including one or more or each of the first through seventh examples, the method further comprises: modifying the pitch period. In a ninth example of the method, optionally including one or more or each of the first through eighth examples, the method further comprises: applying a window function to each representative segment.

The disclosure also provides support for a method comprising: receiving a range of engine speed transition, dividing the range of engine speed transition into a plurality of intermediate speed regions, and for each speed region of the plurality of intermediate speed regions, identifying a representative segment of a sample sound, retrieving the representative segment of the sample sound, applying synchronous pitch overlapping added from the sample sound, and adding the sample sound to an audio output. In a first example of the method, a first representative segment having a first pitch period is identified for a first speed region, a second representative segment having a second pitch period is identified for a second speed region, and a third representative segment having a third pitch period is identified for a third speed region, where the first representative segment, the second representative segment, and the third representative segment are identified at once and in parallel processes. In a second example of the method, optionally including the first example, a first amount of segment overlap is calculated for a first representative segment, a second amount of segment overlap is calculated for a second representative segment, and a third amount of segment overlap is calculated for a third representative segment, and wherein the first amount, the second amount, and the third amount are calculated at once and in parallel processes. In a third example of the method, optionally including one or both of the first and second examples, a first representative segment is retrieved from memory, a second representative segment is retrieved from memory, and a third representative segment is retrieved from memory, and the retrieving performed at once and in parallel processes. In a fourth example of the method, optionally including one or more or each of the first through third examples, a first representative segment is stored as a buffer for a first duration of an addition of a second representative segment and the second representative segment is stored as a buffer for a second duration of the addition of a third representative segment.

The disclosure also provides support for a system for an electric vehicle comprising: a sensor, a plurality of speakers, and a controller configured to receive a range of engine speed transition from the sensor, divide the range of engine speed transition into a plurality of intermediate speed regions, and for each speed region of the plurality of intermediate speed regions, identify a representative segment of a sample sound, retrieve the representative segment of the sample sound, apply synchronous pitch overlapping added from the sample sound, and add the sample sound to an audio output played via the plurality of speakers. In a first example of the system, a pitch of the sample sound is modified in real time to match the range of engine speed transition. In a second example of the system, optionally including the first example, the pitch is modified by overlapping and adding segments of the sample sound in a pitch synchronous manner. In a third example of the system, optionally including one or both of the first and second examples, the sample sound is recorded engine sounds at a fixed engine RPM. In a fourth example of the system, optionally including one or more or each of the first through third examples, the representative segment is overlapped depending on a scale factor.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as vehicle system 100 described with reference to FIG. 1. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for generating a vehicle sound at a modified pitch for a range of vehicle engine speeds, the method comprising:

receiving a range of engine speed transition;

dividing the range of engine speed transition into a plurality of intermediate speed regions; and for each speed region of the plurality of intermediate speed regions, identifying a representative segment of a sample sound based on the pitch of the segment;

re-segmenting the representative segments of the sample sound; and overlapping and adding the representative segments of the sample sound in a pitch synchronous manner to an audio output.

2. The method of claim 1, wherein the modified pitch is based on a desired engine RPM, and the sample sound is an engine sound at a recorded RPM.

3. The method of claim 2, wherein a pitch of the sample sound is modified in real time to match the desired engine RPM.

4. The method of claim 1, wherein the sample sound is recorded engine sounds at a fixed engine RPM.

5. The method of claim 1, wherein the sample sound is divided into the representative segments.

6. The method of claim 5, wherein the representative segments are overlapped depending on a scale factor.

7. The method of claim 5, wherein a pitch period identifies the representative segments.

8. The method of claim 7, further comprising modifying the pitch period.

9. The method of claim 1, further comprising applying a window function to each representative segment.

10. A method for generating a vehicle sound at a modified pitch for a range of vehicle engine speeds, the method comprising:

receiving a range of engine speed transition;

dividing the range of engine speed transition into a plurality of intermediate speed regions;

for each speed region of the plurality of intermediate speed regions, identifying a representative segment of a sample sound;

re-segmenting the representative segments of the sample sound so that each representative segment contains a unique pitch mark; and overlapping and adding the representative segments of the sample sound in a pitch synchronous manner to an audio output.

11. The method of claim 10, wherein a first representative segment having a first pitch period is identified for a first speed region, a second representative segment having a second pitch period is identified for a second speed region, and a third representative segment having a third pitch period is identified for a third speed region, where the first representative segment, the second representative segment, and the third representative segment are identified at once and in parallel processes.

12. The method of claim 10, wherein a first amount of segment overlap is calculated for a first representative segment, a second amount of segment overlap is calculated for a second representative segment, and a third amount of segment overlap is calculated for a third representative segment, and wherein the first amount, the second amount, and the third amount are calculated at once and in parallel processes.

13. The method of claim 10, wherein a first representative segment is retrieved from memory, a second representative segment is retrieved from memory, and a third representative segment is retrieved from memory, and the retrieving performed at once and in parallel processes.

14. The method of claim 10, wherein a first representative segment is stored as a buffer for a first duration of an addition of a second representative segment and the second representative segment is stored as a buffer for a second duration of the addition of a third representative segment.

15. A system for an electric vehicle comprising:

a sensor;

a plurality of speakers; and a controller configured to receive a range of engine speed transition from the sensor;

divide the range of engine speed transition into a plurality of intermediate speed regions;

for each speed region of the plurality of intermediate speed regions, identify a representative segment of a sample sound based on the pitch of the segment;

re-segment the representative segments of the sample sound so that each representative segment contains a unique pitch mark;

overlap and add the representative segments of the sample sound in a pitch synchronous manner; and add the sample sound to an audio output played via the plurality of speakers.

16. The system of claim 15, wherein a pitch of the sample sound is modified in real time to match the range of engine speed transition.

17. The system of claim 15, wherein the sample sound is recorded engine sounds at a fixed engine RPM.

18. The system of claim 15, wherein the representative segments are overlapped depending on a scale factor.

19. The method of claim 1, wherein the representative segments of the sample sound are re-segmented so that each representative segment contains a unique pitch mark.

20. The method of claim 10, wherein the identification of the representative segment of the sample sound for each speed region of the plurality of intermediate speed regions is based on the pitch of the segments.

* * * * *